United States Patent
Wu et al.

(10) Patent No.: US 10,925,138 B2
(45) Date of Patent: Feb. 16, 2021

(54) FLICKER-FREE LINEAR LED DRIVE CIRCUIT

(71) Applicant: UNITY OPTO TECHNOLOGY CO., LTD., New Taipei (TW)

(72) Inventors: Chih-Hsien Wu, New Taipei (TW); Kai-Cheng Chuang, New Taipei (TW); Chun-Chieh Kuo, New Taipei (TW); Yu-Hsien He, New Taipei (TW)

(73) Assignee: UNITY OPTO TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/686,226

(22) Filed: Nov. 18, 2019

(65) Prior Publication Data

US 2020/0359471 A1    Nov. 12, 2020

(30) Foreign Application Priority Data

May 6, 2019    (TW) .............................. 108115497 A

(51) Int. Cl.
*H05B 45/37*    (2020.01)
*H05B 45/44*    (2020.01)
*H05B 45/395*   (2020.01)
*H05B 45/50*    (2020.01)

(52) U.S. Cl.
CPC ............. *H05B 45/37* (2020.01); *H05B 45/44* (2020.01); *H05B 45/50* (2020.01)

(58) Field of Classification Search
None
See application file for complete search history.

(56) References Cited

U.S. PATENT DOCUMENTS

| | | | | |
|---|---|---|---|---|
| 2002/0158590 | A1* | 10/2002 | Saito | H05B 45/37 315/291 |
| 2012/0274230 | A1* | 11/2012 | Kanamori | H05B 45/37 315/250 |
| 2014/0368130 | A1* | 12/2014 | Catalano | F21V 23/00 315/309 |
| 2015/0359059 | A1* | 12/2015 | Barnetson | H05B 45/37 315/186 |

* cited by examiner

*Primary Examiner* — Henry Luong
(74) *Attorney, Agent, or Firm* — Fei-hung Yang

(57) ABSTRACT

A flicker-free linear LED drive circuit is disclosed. The flicker-free linear LED drive circuit converts the input voltage of the external power supply to form an output current to the LED. The flicker-free linear LED drive circuit includes a measuring module, a regulating module and a rectifier module. The flicker-free linear LED drive circuit is characterized in that the measuring module is configured to measure the phase angle of the input voltage after full-wave rectification; the regulating module is used to form the complex voltage signal according to the measurement signal in the voltage waveform of the regulating module for the half-wave period, the conduction angle range formed at the fixed power is used as the basis for electrical conduction in the half-wave period of the input voltage.

16 Claims, 3 Drawing Sheets

FLICKER-FREE LINEAR LED DRIVE CIRCUIT

CROSS-REFERENCE TO RELATED APPLICATIONS

This non-provisional application claims priority under 35 U.S.C. § 119(a) on Patent Application No(s). 108115497 filed in Taiwan, R.O.C. on May 6, 2019, the entire contents of which are hereby incorporated by reference.

BACKGROUND

Technical Field

The present invention relates to the field of LED drive circuits, in particular to a linear LED drive circuit that drives and outputs uniform current in a stable direct current status by a multi-stage switching method after performing full wave rectification of an external alternating current in a half-wave period to conduct an LED to achieve a flicker-free effect.

Description of Related Art

In recent years, light emitting diode (LED) is used extensively in various types of lighting devices to improve people's living environment. There are commercial LED products with the features of a novel design, an improved manufacturing process and having various different applications such as an LED lighting system and an LED drive circuit. In the technical field of LED drive circuits, the LED drive circuit is generally coupled to an external power supply and an LED, wherein circuits including a rectifier, a filter and a voltage regulator are used to output the electric power of an alternating current into a direct current power which is supplied to the LED to achieve the lighting effect. However, errors may be produced during the process of converting the alternating current into the direct current, so that the output current has a slight ripple current. As a result, the outputted direct current is not a complete, smooth and stable current, and flickers may be produced when the LED emits light.

To overcome the aforementioned problem, improved methods are introduced. For linear dimming structures, the conventional way generally includes replacing a capacitor installed in a filter by another capacitor having a larger capacitance or electrically connecting an LED at a negative load end by a parallel connection method in order to reduce the peak-to-peak of the ripple current. However, these methods limit the loaded current and increase the total cost of the LED drive circuit.

In view of the aforementioned deficiencies of the conventional LED drive circuits, the team of the inventor of the present invention based on years of experience in the related industry to conduct extensive research and experiment, and finally developed a flicker-free linear LED drive circuit to overcome the aforementioned drawbacks of the prior art.

SUMMARY

Therefore, it is a primary objective of the present invention to overcome the drawbacks of the prior art by providing a flicker-free linear LED drive circuit that drives and outputs uniform current in a stable direct current status by a multi-stage switching method after performing a full wave rectification of an external alternating current in a half-wave period to conduct an LED to achieve a flicker-free effect.

To achieve the aforementioned and other objectives, the present invention discloses a flicker-free linear LED drive circuit electrically coupled to an external power supply, and the external power supply is AC mains power, and an input voltage of the external power supply is converted into an output current to be supplied to at least one LED to drive the LED to emit light.

The flicker-free linear LED drive circuit comprises a measuring module, a regulating module and a rectifier module. The regulating module is electrically coupled to the rectifier module and the measuring module, and the rectifier module is electrically coupled to the external power supply. The flicker-free linear LED drive circuit is characterized in that the measuring module is provided for measuring a phase angle of the input voltage to generate a measurement signal and transmit the measurement signal to the regulating module to drive the regulating module to receive and adjust the measurement signal, wherein the regulating module sets a conduction angle range under a fixed power, and adjusts the measurement signal according to the phase angle of the measurement signal. In a half-wave period of the input voltage, the measurement signal forms a plurality of voltage signals according to the conduction angle range, and the voltage signals are adjusted to form the output current, wherein the output current which is a direct current signal provided for the LED to emit light. Wherein, the voltage signals have the same maximum current value, and the duty cycle (or duty ratio) of the voltage signals is smaller than the half-wave period of the input voltage to reduce the flicker of the LED formed by the output current. In a linear LED circuit structure, a phase angle of the input voltage is measured for adjusting the input signal to form the voltage signals capable of controlling the duty cycle, so as to reduce the ripple current or noise of the output current to achieve a flicker-free effect.

In addition, the measuring module further has a measuring RC circuit and a measurement amplifier. The measurement amplifier has an input terminal electrically coupled to the measuring RC circuit and a reference voltage device, and a phase of the input voltage is generated and adjusted according to a measured resistance of the measuring RC circuit. In addition, the output terminal of the measurement amplifier is electrically coupled to the regulating module for amplifying the phase of the input voltage and forming and coupling the measurement signal to the regulating module.

Further, the measuring RC circuit has a first filter capacitor. The first filter capacitor is electrically coupled to the rectifier module and the measurement amplifier, and the first filter capacitor acts as a low-pass filter for filtering high frequency signals and forming ripple current signals. By the first filter capacitor, the input voltage forms the ripple current signal to be coupled to the measurement amplifier.

In addition, the regulating module further comprises a regulation comparator and a regulating RC circuit. The regulating RC circuit is provided for coupling the measurement signal to the regulation comparator, so that the regulation comparator receives and adjusts the measurement signal to generate the voltage signals. The regulating RC circuit adjusts the voltage signals to form the output current and couples the output current to the LED. Wherein, the regulation comparator adjusts a duty cycle of the voltage signals according to a compensation capacitance and a compensation resistance of the regulating RC circuit to achieve a flicker-free effect.

Further, the regulating RC circuit has a regulation switch. The regulation switch is electrically coupled to the regulation comparator for conducting or switching off the voltage signals to supply the output current to the LED.

Preferably, the flicker-free linear LED drive circuit further comprises an over-temperature protection module electrically coupled to the regulating module and the LED. Therefore, the temperature of the flicker-free linear LED drive circuit can be detected to adjust the intensity of the output current, so as to prevent the LED from being burned or damaged by overtemperature.

The flicker-free linear LED drive circuit further comprises a lightning protection capacitor electrically coupled to the measuring module and the rectifier module to prevent the flicker-free linear LED drive circuit from being burned or damaged by an instantaneous large current.

The rectifier module further comprises a bridge rectifier circuit and a second filter capacitor. The bridge rectifier circuit has an input terminal electrically coupled to the external power supply and an output terminal electrically coupled to the second filter capacitor, and the second filter capacitor is electrically coupled to the measuring module. Therefore, a half-wave rectification signal is generated for coupling to the measuring module to perform a control of signals.

In summation, the flicker-free linear LED drive circuit of the present invention is a structure built on a linear LED circuit. The phase of the input voltage is measured first, and the input signal is adjusted to form the voltage signals capable of controlling their duty cycle, so as to reduce the ripple current or noise of the output current and achieve a flicker-free effect.

DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention.

The present invention provides a flicker-free linear LED drive circuit 1 built on a linear circuit and capable of adjusting the linear circuit into a uniform direct current to be supplied to at least one LED3 to drive the LED3 to emit light, so as to achieve a flicker-free effect. Wherein, the flicker-free linear LED drive circuit 1 simply uses a unipolar circuit to drive the LED3 without requiring the feedback control of a bipolar circuit, so as to lower the production cost.

Figure 1:
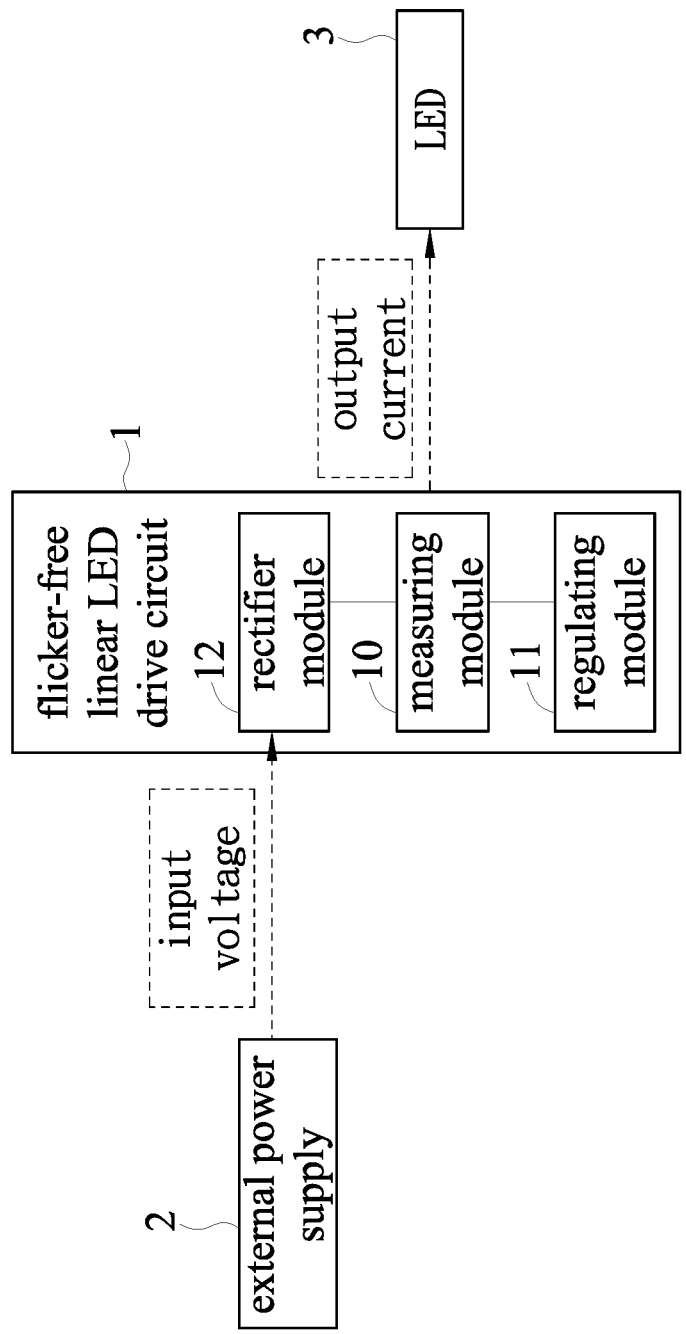
FIG. 1 is a schematic block diagram of a flicker-free linear LED drive circuit of a preferred embodiment of the present invention.
Figure 2:
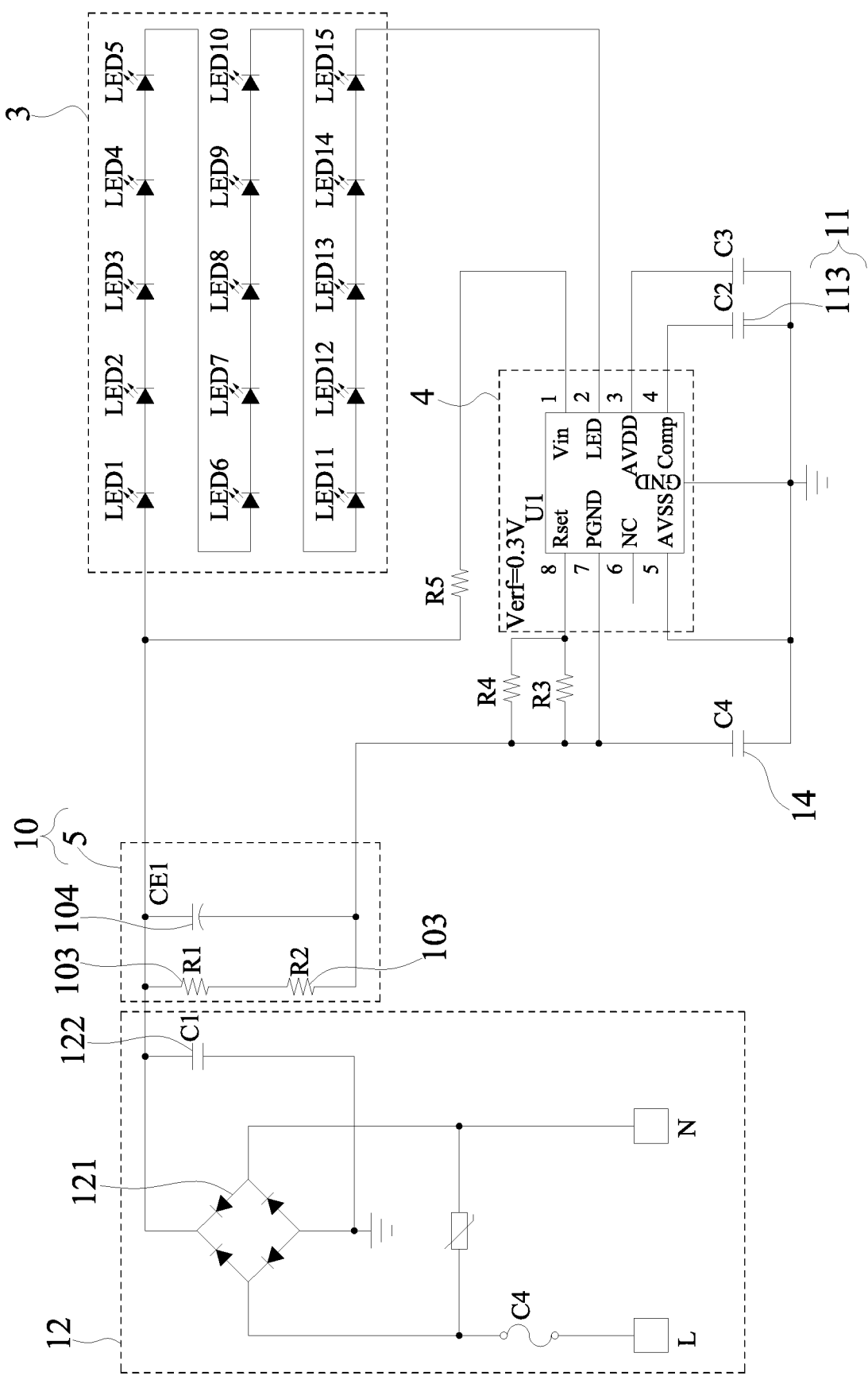
FIG. 2 is a schematic circuit diagram of a flicker-free linear LED drive circuit of a preferred embodiment of the present invention.
Figure 3:
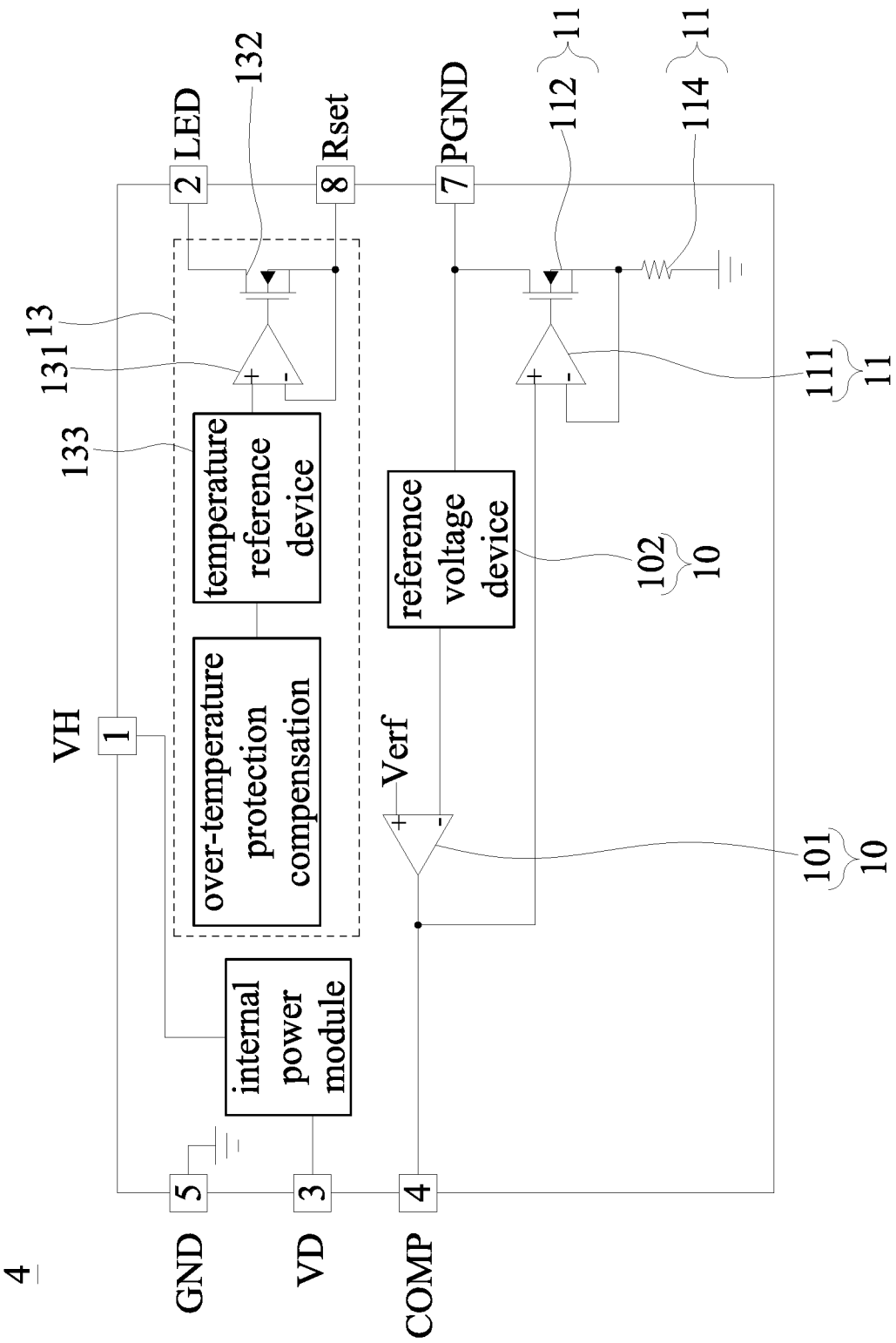
FIG. 3 is a schematic circuit diagram of an integrated circuit of a preferred embodiment of the present invention.

In FIGS. 1 to 3, the flicker-free linear LED drive circuit 1 is electrically coupled to an external power supply 2, and provided for converting an input voltage of the external power supply 2 into an output current to be supplied to the LED3 to drive the LED3 to emit light. The flicker-free linear LED drive circuit 1 comprises a measuring module 10, a regulating module 11 and a rectifier module 12. Wherein, the rectifier module 12 is electrically coupled to the external power supply 2 for performing a full wave rectification of the alternating current signal of the external power supply 2. The regulating module 11 is electrically coupled to the rectifier module 12 and the measuring module 10.

Preferably, the flicker-free linear LED drive circuit 1 further comprises an integrated circuit (IC) 4, having a portion of the circuit miniaturized and installed therein, and a portion of the measuring module 10 and the regulating module 11. Therefore, the flicker-free linear LED drive circuit 1 can be miniaturized to facilitate production and installation.

The flicker-free linear LED drive circuit 1 is characterized in that the measuring module 10 is provided for measuring a phase angle of the input voltage to generate a measurement signal, and the regulating module 11 is provided for receiving and adjusting the measurement signal. Wherein, the regulating module 11 has a conduction angle range set for driving the LED3 to emit light with a fixed power and adjust the measurement signal for the phase angle of the measurement signal. In a half-wave period of the input voltage, the regulating module 11 is provided for forming a plurality of voltage signals from the measurement signal according to the aforementioned conduction angle range, and the voltage signals are adjusted to form the uniform output current, and the output current is a direct current signal provided for the LED3 to emit light. Wherein, the voltage signals has the same maximum current value. In this embodiment, the voltage signals is in a form of square waves, and the duty cycle (or duty ratio) of the voltage signals is smaller than the half-wave period of the input voltage. In other words, there are two half-waves in a single cycle of the input voltage after the full wave rectification. After the integrated circuit 4 (which is the IC component) is driven by high voltage, the measuring module 10 determines the phase angle of the input voltage in the half-wave period first, and then uses the set conduction angle range in the IC component as a basis for turning on/off the integrated circuit 4, and finally the regulating module 11 forms and adjusts the multi-sectional conduction signals (which are the multi-sectional square wave signals). Alternatively, the aforementioned conduction signals (which are the voltage signals) can be in form of a sine wave or trigonometric wave, but not limited to square waves only. Therefore, the conduction angle range is used to determine whether to turn on/off a component such as a MOS component in the integrated circuit (IC) and reduce the ripple current or noise of the output current to achieve a flicker-free effect.

Wherein, the measuring module 10 further has a measuring RC circuit 5 and a measurement amplifier 101, and the measuring RC circuit 5 further has a first filter capacitor (CE1) 104 and a measured resistance (R1, R2) 103. The first filter capacitor (CE1) 104 is electrically coupled to the rectifier module 12 and the measurement amplifier 101, and the first filter capacitor (CE1) 104 serves as a low-pass filter for filtering high frequency signals, forming ripple current signals, and coupling the signals to the measurement amplifier 101. The measurement amplifier 101 has an input terminal electrically coupled to the measuring RC circuit 5 and a reference voltage device 102 for receiving the ripple current signals, and forming and adjusting the phase of the input voltage according to the measured resistance (R1, R2) 103, which is the conduction angle of the input voltage. The measurement amplifier 101 is provided for amplifying the aforementioned signals to form the measurement signal and coupled to the regulating module 11. For example, different input voltages such as 90V and 120V use different phases to set their conduction angle ranges at a same fixed power. In other words, the IC component can determine whether to turn on or off a MOS component inside an IC component at the fixed power, and the voltage 120V has a faster response time, so that the feedback control time is shortened, and the flicker-free effect will be improved accordingly. In other words, how to turn on or off an electrical switch in an IC component is the main subject of this invention. After measurements and full wave rectifications are performed and the voltage waveform are processed by a low-pass filter and a high-pass filter after the full wave rectification, so that the voltage waveform shows a smoother waveform performance, and then the phase angle of the waveform is detected, and whether or not the fixed power in the IC component falls within the conduction angle range is determined, so as to determine whether to turn on or off the MOS in the IC component and achieve a flicker-free effect.

The regulating module 11 further comprises a regulation comparator 111 and a regulating RC circuit. The regulating RC circuit further comprises a compensation capacitance (C2) 113, a compensation resistance 114 and a regulation switch 112, and the regulation switch 112 has an input terminal electrically coupled to the regulation comparator 111 and an output terminal electrically coupled to the LED3. In this embodiment, the regulation switch 112 is a metal oxide semiconductor field effect transistor (MOSFET).

The regulating module 11 receives the measurement signal, and the regulation comparator 111 receives the measurement signal and adjust the output cycle of the regulation comparator 111 according to the compensation capacitance (C2) 113 and the compensation resistance 114. In other words, the regulating module 11 uses the regulation comparator 111 to adjust the duty cycle of the voltage signals, so as to reduce the disturbance of the output current and the ripple current. Further, the regulation comparator 111 has an output terminal coupled to the regulation switch 112 for turning on or off the voltage signals, and a stable direct current signal is generated, so that the output current is supplied to the LED3. Therefore, the LED3 can be driven by the stable direct current signal to provide a flicker-free effect.

In addition, the flicker-free linear LED drive circuit 1 further comprises an over-temperature protection module 13 electrically coupled to the regulating module 11 and the LED3 and having a temperature comparator 131 and a temperature switch 132. Wherein, the temperature comparator 131 has an input terminal electrically coupled to the output current and a temperature reference device 133 for and comparing and determining whether or not the temperature of the heat passing through the LED is too high. The temperature comparator 131 has an output terminal electrically coupled to the temperature switch 132, and when output current causes a too-high temperature, the temperature switch 132 turns off the output current to protect the LED3 and prevent the LED3 from being burned or damaged by overtemperature. Preferably, the over-temperature protection module 13 is installed in the integrated circuit 4 to facilitate the miniaturization of the whole integrated circuit.

The flicker-free linear LED drive circuit 1 further comprises a lightning protection capacitor (C4) 14 electrically coupled to the measuring module 10 and the rectifier module 12. The lightning protection capacitor (C4) 14 is capable of preventing the occurrence of a large instantaneous current or short circuit and preventing the flicker-free linear LED drive circuit 1 from being burned or damaged, so as to protect the LED3.

In addition, the rectifier module 12 has a bridge rectifier circuit 121 and a second filter capacitor (C1) 122. The bridge rectifier circuit 121 has an input terminal electrically coupled to the external power supply 2 and an output terminal electrically coupled to the second filter capacitor (C1) 122, and the second filter capacitor (C1) 122 is electrically coupled to the measuring module 10. Therefore, the half-wave rectification signal is generated and coupled to the measuring module 10 for controlling signals.

In summation of the description above, the flicker-free linear LED drive circuit 1 of the present invention is a structure installed on a linear LED circuit. In other words, the present invention sets the timing for turning on and off the electrical switch in the IC component effectively. After measurements and full wave rectifications are performed, and the voltage waveform are processed by a low-pass filter and a high-pass filter after the full wave rectification, the voltage waveform shows a smoother waveform performance, and then the phase angle of the waveform is detected, and whether or not the fixed power in the IC component falls within the conduction angle range is determined, and then the phase angle of the waveform is detected, and whether or not the fixed power in the IC component falls within the conduction angle range, so as to determine whether to turn on or off the MOS switch in the IC component, reduce the ripple current or noise of the output current, and achieve a flicker-free effect.

What is claimed is:

1. A flicker-free linear LED drive circuit, electrically coupled to an external power supply which is an alternating current power supply, and converting an input voltage of the external power supply into an output current to be supplied to at least one LED; the flicker-free linear LED drive circuit comprising a measuring module, a regulating module and a rectifier module, and the regulating module being electrically coupled to the rectifier module and the measuring module, and the rectifier module being electrically coupled to the external power supply, characterized in that the measuring module is provided for measuring a phase angle of the input voltage to generate and send a measurement signal to the regulating module, wherein the regulating module sets a conduction angle range having a fixed power for driving of the at least one LED, and adjusts the measurement signal according to a phase angle of the measurement signal, and the measurement signal forms a plurality of voltage signals during a half-wave period of the input voltage according to the conduction angle range and adjusts the plurality of voltage signals to form the output current, and the output current is a direct current signal provided for the at least one LED to emit light; wherein the plurality of voltage signals has a same maximum current value, and a duty cycle of the plurality of voltage signals is smaller than the half-wave period of the input voltage to reduce flickering of the at least one LED formed by the output current;

wherein the measuring module further comprises a measuring RC circuit and a measurement amplifier; the measurement amplifier has an input terminal electrically coupled to the measuring RC circuit and a reference voltage device for adjusting and generating the phase of the input voltage according to a measured resistance of the measuring RC circuit, and the measurement amplifier has an output terminal electrically coupled to the regulating module for forming and coupling the measurement signal to the regulating module;

wherein the measuring RC circuit further comprises a first filter capacitor electrically coupled to the rectifier module and the measurement amplifier, so that the input voltage forms a ripple signal and couples the ripple signal to the measurement amplifier;

wherein the regulating module further comprises a regulation comparator and a regulating RC circuit; the regulating RC circuit is provided for coupling the measurement signal to the regulation comparator, so that the regulation comparator can receive and adjust the measurement signal to generate the plurality of voltage signals, and the regulating RC circuit adjusts the plurality of voltage signals to form the output current and couples the output current to the at least one LED; wherein the regulation comparator adjusts the duty cycle of the plurality of voltage signals according to a compensation capacitance and a compensation resistance of the regulating RC circuit;

wherein the regulating RC circuit further comprises a regulation switch electrically coupled to the regulation comparator for conducting or switching off the plurality of voltage signals to form the output current to be supplied to the at least one LED.

2. The flicker-free linear LED drive circuit according to claim 1, further comprising an over-temperature protection module electrically coupled to the regulating module and the at least one LED, for detecting a temperature of the flicker-free linear LED drive circuit to adjust an intensity of the output current.

3. The flicker-free linear LED drive circuit according to claim 2, further comprising a lightning protection capacitor electrically coupled to the measuring module and the rectifier module.

4. The flicker-free linear LED drive circuit according to claim 3, wherein the rectifier module further has a bridge rectifier circuit and a second filter capacitor; the bridge rectifier circuit has an input terminal electrically coupled to the external power supply and an output terminal electrically coupled to the second filter capacitor, and the second filter capacitor is electrically coupled to the measuring module.

5. The flicker-free linear LED drive circuit according to claim 1, further comprising an over-temperature protection module electrically coupled to the regulating module and the at least one LED, for detecting a temperature of the flicker-free linear LED drive circuit to adjust an intensity of the output current.

6. The flicker-free linear LED drive circuit according to claim 5, further comprising a lightning protection capacitor electrically coupled to the measuring module and the rectifier module.

7. The flicker-free linear LED drive circuit according to claim 6, wherein the rectifier module further has a bridge rectifier circuit and a second filter capacitor; the bridge rectifier circuit has an input terminal electrically coupled to the external power supply and an output terminal electrically coupled to the second filter capacitor, and the second filter capacitor is electrically coupled to the measuring module.

8. The flicker-free linear LED drive circuit according to claim 1, further comprising an over-temperature protection module electrically coupled to the regulating module and the at least one LED, for detecting a temperature of the flicker-free linear LED drive circuit to adjust an intensity of the output current.

9. The flicker-free linear LED drive circuit according to claim 8, further comprising a lightning protection capacitor electrically coupled to the measuring module and the rectifier module.

10. The flicker-free linear LED drive circuit according to claim 9, wherein the rectifier module further has a bridge rectifier circuit and a second filter capacitor; the bridge rectifier circuit has an input terminal electrically coupled to the external power supply and an output terminal electrically coupled to the second filter capacitor, and the second filter capacitor is electrically coupled to the measuring module.

11. The flicker-free linear LED drive circuit according to claim 1, further comprising an over-temperature protection module electrically coupled to the regulating module and the at least one LED, for detecting a temperature of the flicker-free linear LED drive circuit to adjust an intensity of the output current.

12. The flicker-free linear LED drive circuit according to claim 11, further comprising a lightning protection capacitor electrically coupled to the measuring module and the rectifier module.

13. The flicker-free linear LED drive circuit according to claim 12, wherein the rectifier module further has a bridge rectifier circuit and a second filter capacitor; the bridge rectifier circuit has an input terminal electrically coupled to the external power supply and an output terminal electrically coupled to the second filter capacitor, and the second filter capacitor is electrically coupled to the measuring module.

14. The flicker-free linear LED drive circuit according to claim 1, further comprising an over-temperature protection module electrically coupled to the regulating module and the at least one LED, for detecting a temperature of the flicker-free linear LED drive circuit to adjust an intensity of the output current.

15. The flicker-free linear LED drive circuit according to claim 14, further comprising a lightning protection capacitor electrically coupled to the measuring module and the rectifier module.

16. The flicker-free linear LED drive circuit according to claim 15, wherein the rectifier module further has a bridge rectifier circuit and a second filter capacitor; the bridge rectifier circuit has an input terminal electrically coupled to the external power supply and an output terminal electrically coupled to the second filter capacitor, and the second filter capacitor is electrically coupled to the measuring module.

* * * * *